No. 711,128. Patented Oct. 14, 1902.
G. SCHIRMER.
MEASURING INSTRUMENT FOR LIQUIDS.
(Application filed Mar. 18, 1902.)
(No Model.)
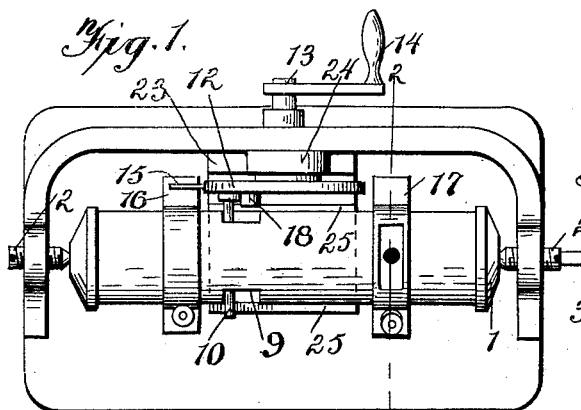
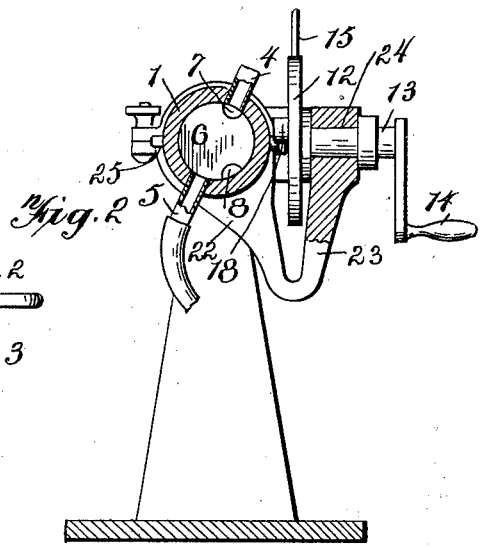
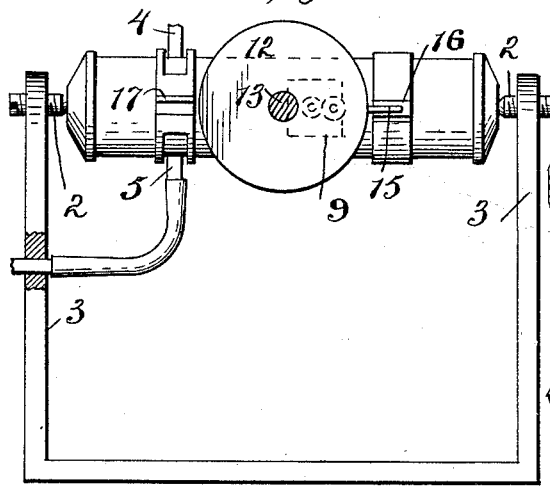
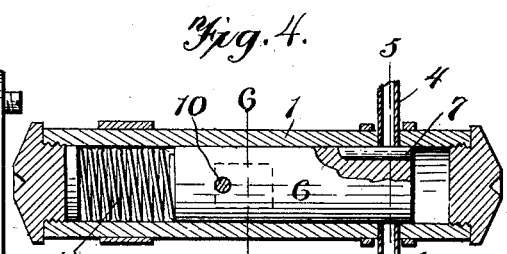
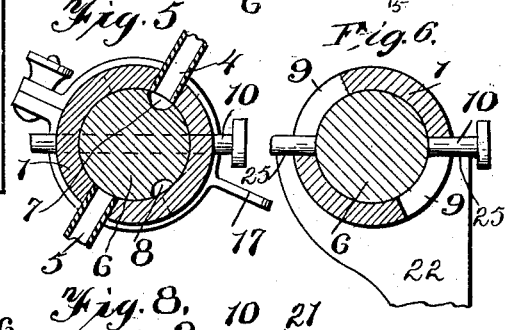
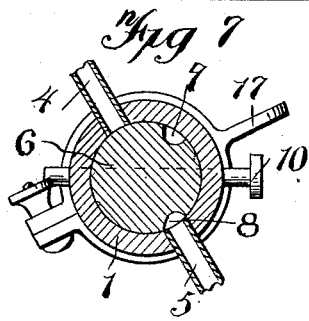
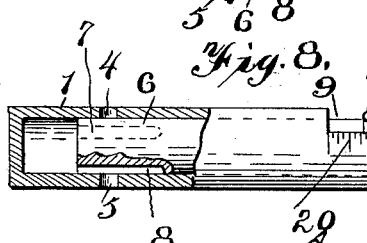
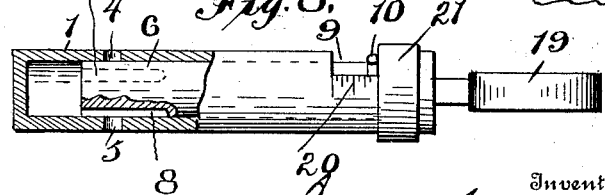
Witnesses
Geo E Frech
R. J. Johnston
Inventor
Gustav Schirmer
By Hensey & Gough
Attorneys
THE NORRIS PETERS CO., PHOTO-LITHO., WASHINGTON, D. C.

UNITED STATES PATENT OFFICE.

GUSTAV SCHIRMER, OF CHICAGO, ILLINOIS.

MEASURING INSTRUMENT FOR LIQUIDS.

SPECIFICATION forming part of Letters Patent No. 711,128, dated October 14, 1902.

Application filed March 18, 1902. Serial No. 98,764. (No model.)

*To all whom it may concern:*

Be it known that I, GUSTAV SCHIRMER, a citizen of the United States, residing at Chicago, in the county of Cook and State of Illinois, have invented certain new and useful Improvements in Measuring Instruments for Liquids, Medicines, &c., of which the following is a specification, reference being had to the accompanying drawings.

This invention has relation to measuring instruments for liquids, medicines, &c.; and it consists in the novel construction and arrangement of its parts, as hereinafter described.

The object of the invention is to provide an instrument for measuring medicines or liquids that will automatically deliver from the same a number of discharges of the same quantity which has been predetermined.

It consists, primarily, of an oscillating cylinder having located diametrically opposite therein an inlet and outlet port, with a reciprocating plunger located in said cylinder, said plunger having in its periphery grooves adapted to register alternately with the inlet and outlet openings, said plunger being adapted to draw in a charge of liquid and expel the same in equal given quantities.

In the accompanying drawings, Figure 1 is a top plan view of the invention. Fig. 2 is a transverse sectional view of the invention, cut on the line 2 2 of Fig. 1. Fig. 3 is a side elevation of the invention with parts broken away. Fig. 4 is a longitudinal sectional view of the cylinder. Fig. 5 is a transverse sectional view of the cylinder, cut on the line 5 5 of Fig. 4. Fig. 6 is a transverse sectional view of the cylinder, cut on the line 6 6 of Fig. 4. Fig. 7 is a transverse sectional view of the cylinder, cut on the line 5 5 of Fig. 4, but showing a different position of the parts from that shown in Fig. 5. Fig. 8 is a side elevation of a modified form of the invention, partly in section.

The oscillating cylinder 1 is secured by the pintles 2 2 to the frame 3. The inner ends of said pintles are pointed and engage the heads of the cylinder 1 and form the points upon which the said cylinder 1 oscillates. The cylinder 1 is hollow in its interior and is provided in its upper side with the inlet-port 4 and in its lower side with the outlet-port 5, the ports 4 and 5 being diametrically opposite each other. The port 4 may be connected by a flexible tube with a suitable reservoir containing the liquid. (Not shown in the drawings.) The piston 6 fits snugly in the interior of the cylinder 1, said piston having in its upper side a groove 7 and in its lower side a groove 8. The groove 7 is adapted at intervals to register with the port 4, and at different intervals the groove 8 is adapted to register with the port 5. The said grooves are not located diametrically opposite each other in the surface of the piston. The said grooves extend from one end of the piston back a sufficient distance along the same. The sides of the cylinder 1 are provided with the opposite openings 9, and the pin 10 passes through the said openings 9 and also through the piston 6. A coil-spring 11 is interposed between the rear end of the piston 6 and one of the cylinder-heads, the tension in said spring having a tendency to force the said piston toward the opposite cylinder-head.

A means for oscillating the cylinder 1 and reciprocating the piston 6 is provided, said means consisting of a disk 12, mounted on the end of the shaft 13. A crank 14 or other suitable means is provided for revolving the said shaft. The periphery of the disk 12 is provided with a pin 15, which is adapted to alternately engage the lugs 16 and 17, fixed to the side of the cylinder 1. The inner face of the disk 12 is provided with a crank-pin 18, which is at all times in engagement with one end of the pin 10. It will thus be seen that as the shaft 13 is revolved the crank-pin 18, engaging the pin 10, will force the said pin and the plunger 6 back against the tension of the spring 11, and as the eccentric 18 retreats from the pin 10 the tension of the said spring 11 will move the plunger 6 forward and cause the said pin 10 to follow the eccentric 18. The part 22 is provided with the bend 23, which passes under the disk 12. The upper outside end of said part surrounds the shaft 13, as shown in Fig. 2. The upper inside ends of the said part 22 terminate in guides 25, upon which the pin 10 reciprocates, thus causing it and its attachments to move in a straight path. Again, as the disk 12 revolves the pin 15 will strike the upper face of the lug 16 and cause the cylinder 1 to oscillate in one direction and permitting the pin 15 to escape the end of the lug 16, and in completing the revolution the disk 12 carries the pin 15 around, which engages the under side of the lug 17 and causes the cylinder 1 to oscillate in the opposite direction. By the arrangement of the parts it will be observed that the oscillation of the cylinder takes place while the piston is at rest, and vice versa.

The operation of the device is as follows: Presuming the parts to be in the positions as shown in Figs. 4 and 5 and the piston 6 retreating, it will be observed that the groove 7 is in register with the port 4 and that the groove 8 is not in register with the port 5, and consequently the latter port is closed by the side of the plunger. As the plunger 6 retreats the liquid is drawn into the interior of the cylinder 1, and when the plunger 6 is at the end of its stroke the cylinder 1 is oscillated and the parts assume the positions as shown in Fig. 7—that is, the groove 8 is made to register with the port 5, while the groove 7 is passed out of register with the port 4 and the said port 4 is closed. The piston 6 then moves forward and expels the liquid previously drawn into the cylinder 1 through the groove 8 and the port 5. Thus the liquid is introduced into the instrument in a continuous stream and is expelled in separate quantities.

In the form of the invention as shown in Fig. 8 the construction of the cylinder 1 and the piston 6 is substantially the same as that above described. The piston 6, however, is provided with a handle 19, which projects beyond the end of the cylinder 1. The piston 6 is reciprocated by means of the handle 19, and the cylinder 1 is also oscillated, the pin 10 passing through the opening 9, the sides of the said opening 9 engaging the said pin and limiting the oscillation. One edge of the opening 9 is provided with a series of graduations 20, and an adjustable band 21 is located on the end of the cylinder 1. It will be seen that by adjusting the said band along the graduations 20 the stroke of the piston 6 may increase or decrease, and thus the quantity of the separate discharges of the instrument may be regulated.

Having described my invention, what I claim as new, and desire to secure by Letters Patent, is—

1. A measuring instrument consisting of an oscillating cylinder having inlet and outlet ports, arranged diametrically opposite each other, a reciprocating piston located within the cylinder and having grooves located on radii of its periphery not at the extremities of the same diameter.

2. A measuring instrument consisting of an oscillating cylinder having inlet and outlet ports, a reciprocating piston located in said cylinder and having grooves adapted to register alternately with said inlet and outlet ports, a spring located within the cylinder and interposed behind said piston, said cylinder having in its sides openings, a pin passing through said openings and adapted to engage the edges thereof, and limit the oscillations of the cylinder, a means for oscillating the cylinder and engage said pin to cause the piston to reciprocate.

3. A measuring instrument consisting of an oscillating cylinder having inlet and outlet ports, a reciprocating piston located within said cylinder and having grooves adapted to register alternately with said inlet and outlet ports, a spring located in said cylinder and interposed behind the piston, said cylinder having in its sides opposite openings, a pin passing through said openings and through the piston and adapted to engage the sides of the openings and limit the oscillations of the cylinder, lugs located on the exterior of the cylinder at different angles to each other, a revolving disk carrying a pin adapted to engage the said lugs alternately, an eccentric located on said disk and adapted to engage said pin whereby the cylinder is caused to oscillate and the piston to reciprocate.

4. A measuring instrument consisting of a cylinder adapted to oscillate laterally at intervals, said cylinder having inlet and outlet ports, a piston located within said cylinder and adapted to reciprocate in opposite directions at intervals, the reciprocation of the piston taking place during the intervals that the cylinder is at rest and vice versa, said piston having grooves adapted to register alternately with the inlet and outlet ports of the cylinder and a means for operating the parts.

In testimony whereof I affix my signature in the presence of two witnesses.

GUSTAV SCHIRMER.

Witnesses:
J. I. SCHIMEK,
HENRY F. STECKER.